US010255727B1

(12) United States Patent
Gribetz et al.

(10) Patent No.: US 10,255,727 B1
(45) Date of Patent: Apr. 9, 2019

(54) SYSTEMS AND METHODS TO PROVIDE EFFECTS FOR VIRTUAL CONTENT IN AN INTERACTIVE SPACE

(71) Applicant: Meta Company, San Mateo, CA (US)

(72) Inventors: Meron Gribetz, Belmont, CA (US); Michael Stein, San Francisco, CA (US); Qasim Khan, Livermore, CA (US)

(73) Assignee: Meta Company, San Mateo, CA (US)

( * ) Notice: Subject to any disclaimer, the term of this patent is extended or adjusted under 35 U.S.C. 154(b) by 0 days.

(21) Appl. No.: 15/809,894

(22) Filed: Nov. 10, 2017

(51) Int. Cl.
| *G06T 19/00* | (2011.01) |
| *G02B 27/00* | (2006.01) |
| *G02B 27/01* | (2006.01) |
| *H04N 13/279* | (2018.01) |
| *F21V 8/00* | (2006.01) |

(52) U.S. Cl.
CPC ........ *G06T 19/006* (2013.01); *G02B 27/0093* (2013.01); *G02B 27/0172* (2013.01); *H04N 13/279* (2018.05); *G02B 6/0035* (2013.01); *G02B 2027/014* (2013.01); *G02B 2027/0187* (2013.01)

(58) Field of Classification Search
CPC ............ G02B 27/017; G02B 2027/014; G02B 27/0172; G02B 2027/0178; G02B 2027/0141; G02B 27/01; G02B 2027/0174; G06F 3/011; G06F 3/012; G06F 3/013; G06F 3/017; G06F 3/04815; G06F 3/04845; G06F 3/04842; G06T 19/006; G06T 19/20; G06T 2219/016; G06T 19/00; G06T 17/00; G06T 19/003; G06T 2219/2008; A63F 2300/8082

USPC .......................................... 345/7, 8; 359/630
See application file for complete search history.

(56) References Cited

U.S. PATENT DOCUMENTS

| 7,075,531 B1 * | 7/2006 | Ando ...................... G06T 13/80 345/420 |
| 7,825,940 B1 * | 11/2010 | Vieilly .................... G06T 19/20 345/419 |
| 2012/0304059 A1 * | 11/2012 | McCloskey ............. G06F 3/017 715/709 |

(Continued)

OTHER PUBLICATIONS

Kalkofen, D., et al. "Explosion Diagrams in Augmented Reality." 2009 IEEE Virtual Reality Conference, Mar. 14, 2009, pp. 71-78., doi:10.1109/vr.2009.4811001. (Year: 2009).*

(Continued)

*Primary Examiner* — Koosha Sharifi-Tafreshi
(74) *Attorney, Agent, or Firm* — Sheppard Mullin Richter & Hampton LLP (57) ABSTRACT

A system configured to provide effects for virtual content in an interactive space may comprise one or more of a headset, one or more image-forming components, one or more physical processors, and/or other components. An image forming virtual object may be presented to the user via the one or more image-forming components. The virtual object may be perceived as being present in the real world. A user may utilize a virtual tool to apply an exploder effect and/or other effect. The virtual tool providing the exploder effect may take the form of a rod-shaped object forming a wand. The virtual tool may be inserted into the virtual object. the virtual tool may be drawn away from the virtual object to cause the virtual object to achieve an exploded view state.

20 Claims, 6 Drawing Sheets

(56) References Cited

U.S. PATENT DOCUMENTS

2015/0220244 A1* 8/2015 Vats .................... G06F 3/04815
 715/850
2016/0026253 A1 1/2016 Bradski
2017/0235143 A1 8/2017 Chi

OTHER PUBLICATIONS

Oy, flyAR Augmented Reality Studio. YouTube, YouTube, May 19, 2017, www.youtube.com/watch?v=4EFqZzVTeT0. (Year: 2017).*

* cited by examiner

SYSTEMS AND METHODS TO PROVIDE EFFECTS FOR VIRTUAL CONTENT IN AN INTERACTIVE SPACE

FIELD OF THE INVENTION

The systems and methods described herein relate to providing effects for virtual content in an interactive space.

BACKGROUND OF THE INVENTION

Interactive spaces, such as augmented reality environments, may be used to present virtual content to users. During such presentations, users may interact with the virtual content.

SUMMARY

The systems and methods described herein facilitate providing effects for virtual content in an interactive space. The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. A virtual reality environment may refer to a space that includes the virtual environment. The terms "space" and "environment" may be used interchangeably herein.

Virtual content, including virtual objects, may be displayed or posed on a virtual presentation area. Users viewing the virtual content on the virtual presentation area may interact with the displayed virtual objects. The interactions may include applying effects to virtual objects to change the visual appearance of the virtual objects. The effects may include an exploder effect. The exploder effect may cause parts of a virtual object to separate to show the relationship or order of assembly of the various parts. The exploder effect may be applied to an entire virtual model, or may be applied to a part or component of the virtual model that itself contains a number of subparts and/or is configured to display those subparts when the exploder effect is applied by a user of the system. For example, separation may be applied to one or more of an entire collection of the parts making up an virtual object, a subset of the entire collection of parts, and/or other combinations of parts.

A system configured to provide effects for virtual content in an interactive space may comprise one or more of a headset, one or more image-forming components, one or more physical processors, and/or other components.

The one or more image-forming components may comprise one or more of one or more light sources, one or more optical elements, and/or other components. The one or more light sources may be configured to emit light forming images of virtual content. The one or more optical elements may be configured to provide the light emitted from the one or more light sources to one or both eyes of the user to generate the interactive space.

The one or more physical processors may be configured by machine-readable instructions. Executing the machine-readable instructions may cause the one or more physical processors to facilitate providing views of virtual content in an interactive space. The machine-readable instructions may comprise one or more computer program components. The one or more computer program components may comprise one or more of a control component, an input component, an application component, and/or other components.

The control component may be configured to control the one or more image-forming components to generate the images forming the virtual content. The one or more image-forming components may be controlled to generate an image forming an instance of a virtual object. The one or more image-forming components may be controlled to generate an image forming an instance of a virtual tool. The virtual tool may represent an exploder effect. In some implementations, the virtual tool may be rod-shaped, e.g., forming a wand and/or skewer.

The input component may be configured to obtain user input to apply the exploder effect to the virtual object. The user input may comprise one or more of selection of the virtual tool, a pose of the virtual tool in relation to the virtual object, a gesture configured to effectuate the application of the exploder effect, and/or other input. The pose may include a position and/or heading of the virtual tool with respect to a position and/or heading of the virtual object. For example, the pose may correspond to a perception of the virtual tool being inserted into the virtual object. The gesture may include drawing the virtual tool away from the virtual object.

The application component may be configured to, in response to obtaining the user input comprising the gesture, specify a value of a display parameter for the virtual object. The value of the display parameter may effectuate the application of the exploder effect to the virtual object. For example, the specification of the value of the display parameter may cause the virtual object to be perceived in an exploded view state.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
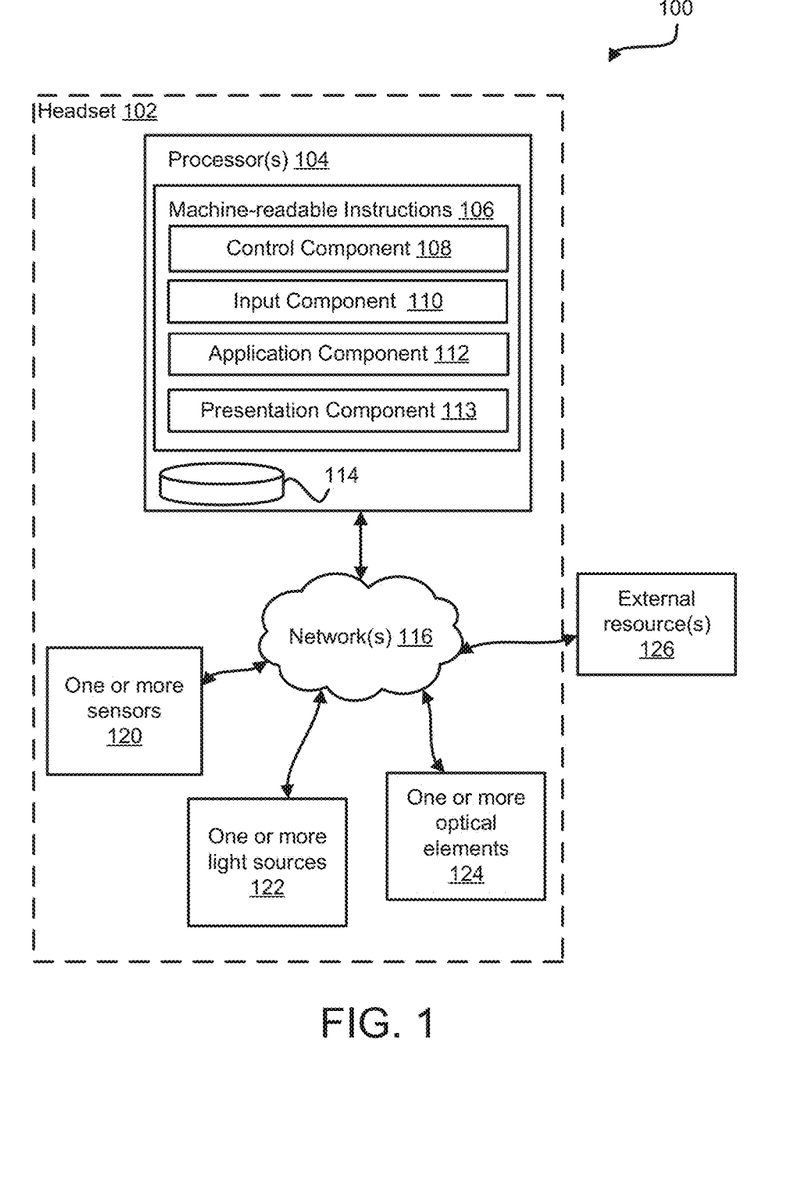
FIG. 1 illustrates a system configured to provide effects for virtual content in an interactive space, in accordance with one or more implementations.

FIG. 1 shows a system 100 configured to provide effects for virtual content in an interactive space. The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. A virtual reality environment may refer to a space that includes the virtual environment. The terms "space" and "environment" may be used interchangeably herein.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form and/or perceive coherent virtual content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

User interactions with virtual content may include applying effects to the virtual content. The effects may change the visual appearance of the virtual content. For example, an effect may include an exploder effect. An application of the exploder effect to a virtual object may cause the virtual object—or a part or component of the virtual object configured to respond to the application of the exploder effect—to be perceived in an "exploded view" state. In the exploded view state, various parts of the virtual object may be separated to show a relationship or order of assembly of the various parts. The various parts may refer one or more of an entire collection of the parts making up the virtual object, a subset of the entire collection of parts, and/or other combinations of parts. In some implementations, the separation may be in the form of one or more of a linear separation (e.g., separation with respect to a line, such as a centerline), a circular separation (e.g., separation with respect to a reference circle), a cylindrical separation (e.g. separation with respect to a reference cylinder), and/or other types of separations. The user may utilize a virtual tool, in the form of a rod-shaped wand and/or skewer (see, e.g., FIG. 7), to apply the exploder effect. It is noted that while some descriptions may be directed to a "wand," this is not to be considered limiting. Instead, it is to be understood that the virtual tool may be implemented in other forms. The user may provide input to effectuate the exploder effect. The input may include one or more of selection of the virtual tool, posing the virtual tool in relation to the virtual object or part thereof, one or more gestures, and/or other input. The posing of the virtual tool may include inserting the virtual tool into the virtual object or part thereof. The one or more gestures may include drawing the virtual tool away from the virtual object once it has been inserted into the virtual object, and/or other gestures.

In some implementations, different gestures and/or combinations of gestures may be required to obtain different types of separation or explosion effects. For example, a first set of gestures may achieve linear separation of parts or components within the virtual object, a second set of gestures may achieve circular separation, a third set of gestures may achieve cylindrical separation, and/or other gestures may achieve other types of separation. For example, the first set of gesture may include the drawing away or pulling gesture and/or other gestures. The second set of gestures may include the drawing away gestures with an added twisting gesture and/or other gestures. The third set of gestures may include the drawing away gestures and an added turning gesture and/or other gestures.

The system 100 may include one or more of a headset 102, one or more physical processors 104, one or more sensors 120, one or more light sources 122, one or more optical elements 124, and/or other components. A set of components comprising at least one light source and at least one optical element may be referred to herein as an "image-forming component." An image-forming component may be configured to emit light rays, via a light source, forming images of virtual content. When headset 102 is installed on the head of the user, the light rays may be provided, via an optical element, to an eye of the user. The images formed by the light rays may be superimposed over views of the real world to create an interactive space.

In some implementations, one or more components of headset 102 may be included with and/or otherwise held by headset 102. By way of non-limiting illustration, headset 102 may include and/or otherwise hold one or more of one or more physical processors 104, one or more light sources 122, one or more optical elements 124, one or more sensors 122, and/or other components. The headset 102 may be configured to be installed (e.g., worn) on a head of a user. By way of non-limiting illustration, headset 102 may include one or more of a head-mounted display (HMD), glasses, goggles, and/or other devices.

In some implementations, one or more components of system 100 may be included in one or more devices external to headset 102. For example, one or more components may be included in one or more of a desktop computer, a laptop computer, other mobile computer configurations, and/or other computing devices. By way of non-limiting illustration, one or more physical processors 104 and/or other components may be included in a mobile computing device external to headset 102 (not shown in FIG. 1). The headset 102 may be tethered and/or otherwise connected to the one or more external devices. Such connection may be wired (e.g., USB, HDMI, and/or other wired connection) and/or wireless (e.g., Bluetooth, Wi-Fi, and/or other wireless connection).

In some implementations, individual light sources of one or more light sources 122 may be configured to emit light forming images of virtual content. An individual light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be received by one or more optical elements 124. In some implementations, control of position and/or light generation of individual light sources 122 may impact one or more aspects of a perceived three-dimensional light field and/or virtual content within the three-dimensional light field. One or more aspects of virtual content within a three-dimensional light field may include one or more of a perceived range of the virtual content from a user, a perceived depth of the virtual content, a perceived size of the virtual content, and/or other aspects of the virtual content.

In some implementations, one or more optical elements 124 may form at least part of a portion of headset 102 through which a user may view the real world. Individual optical elements of one or more optical elements 124 may be configured to provide the light emitted from the light source to an eye of the user to generate an interactive space. In some implementations, one or more image-forming components may be configured to present images individually to each eye of the user as stereo image pairs. In this configuration, headset 102 may include a first set of image-forming components for one eye and a second set of image-forming components for another eye.

In some implementations, individual optical elements of one or more optical elements 124 may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, individual optical elements of one or more optical elements 124 may be arranged on headset 102 such that, when headset 102 is installed on the head of a user, the user's gaze may be directed toward one or more optical elements 124. In some implementations, one or more optical elements 124 may be arranged on headset 102 such that, when headset 102 is installed on the head of the user, light rays generated by one or more light sources 122 may be directed onto one or more optical elements 124 to form images of virtual content on one or more optical elements 124. The images of virtual content formed on one or more optical elements 124 may be superimposed over the user's view of the real world through one or more optical elements 124 to create an interactive space. It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations.

In some implementations, one or more optical elements 124 may be arranged on headset 102 such that light rays generated by one or more light sources 122 may be directed at one or more optical elements 124, coupled into one or more optical elements 124, and directed out of one or more optical elements 124 into an eye of a user. The images of virtual content may be projected onto a retina of the eye such that the images may be superimposed over the user's view of the real world.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

Figure 3:
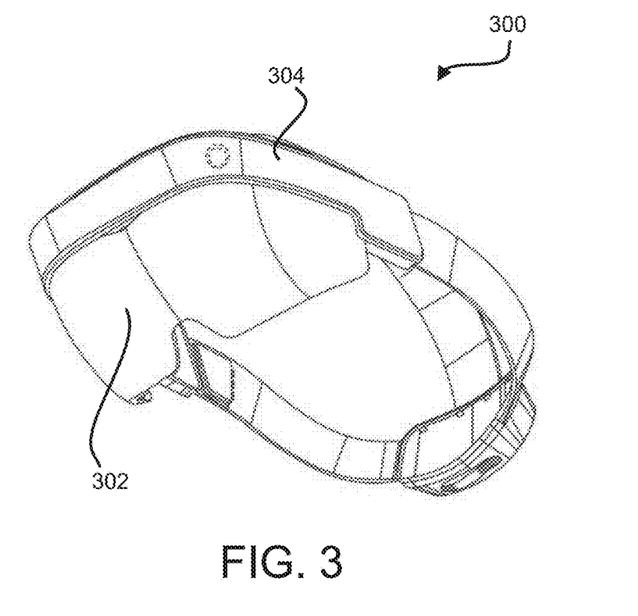
FIG. 3 illustrates an exemplary headset.

Referring now to FIG. 3, in some implementations, a headset (e.g., headset 102 in FIG. 1) may comprise an HMD 300. One or more components of system 100 (FIG. 1) may be held by and/or comprise part of HMD 300. By way of non-limiting illustration, an optical element of an image-forming component may comprise at least part of a visor portion 302 of HMD 300. Components such as one or more of physical processors, light sources of image-forming components, one or more sensors, and/or other components may be incorporated into a housing portion 304 and/or other portions of HMD 300.

Figure 4:
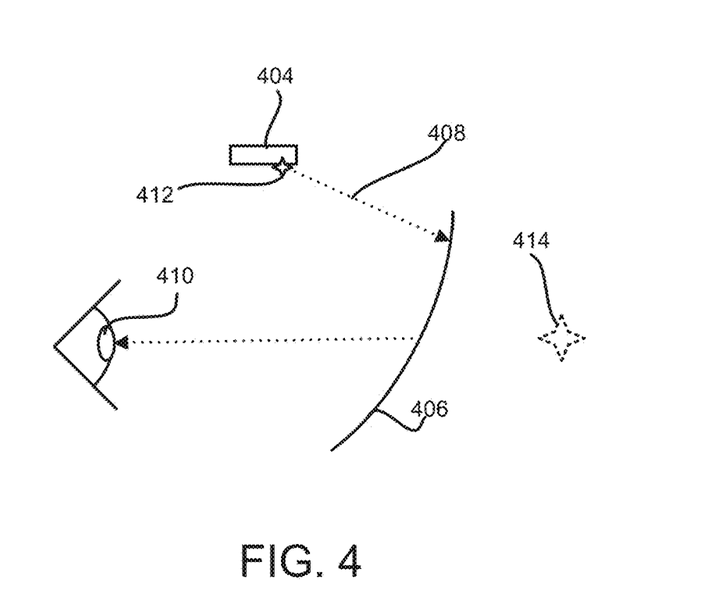
FIG. 4 illustrates an exemplary image-forming component.

FIG. 4 illustrates a configuration of a light source 404 and an optical element 406 of an image-forming component, in accordance with one or more implementations. The optical element 406 may comprise, and/or may be part of, a visor portion of a headset. The light source 404 may be configured to emit light rays, including light ray 408. The light rays may form images, including image 412. The light rays may be received by optical element 406 and provided to an eye 410 of a user. The light rays received by eye 410 may form virtual content 414 (e.g., a virtual object) perceived to lie within three-dimensional space in the user's vision field or portion thereof.

Returning to FIG. 1, individual sensors of one or more sensors 120 may be configured to generate output signals conveying position information, and/or other information. Position information may include one or more of positions of one or more surfaces of one or more real-world objects within a real-world environment, ranges of one or more surfaces of one or more real-world objects from a sensor, and/or other information. In some implementations, a position of a surface may be expressed as one or more of distance from an individual sensor, an angle from reference line (e.g., a horizontal line), and/or other information. By way of non-limiting illustration, a position may be represented as a vector having vector components.

In some implementations, one or more sensors 120 may include one or more of a camera, a three-dimensional scanner, a depth sensor or depth camera, a rangefinder, a laser gauge, a time-of-flight sensor, an IR camera/emitter pair, a passive, structured, or unstructured light stereo pair, and/or other devices. A depth sensor or depth camera may include a three-dimensional volumetric imaging sensor, and/or other devices. In some implementations, sensor output of an individual sensor may convey position information in the form of a point cloud. A point cloud may include a set of points that may lie on surfaces of real-world objects within a range of the sensor. The position information may include individual ranges or positions of individual points representing ranges or positions of surfaces the individual points may lie on.

In some implementations, a sensor of one or more sensors 120 may comprise a camera. An individual camera may be configured to generate image information defining images of a real-world environment within a field-of-view of the camera. Position information may be determined from the image information and/or other information using one or more image-based approaches. The one or more image-based approaches may include one or more of computer vision, object recognition, SIFT, SURF, position triangulation, and/or other techniques. While a point within a point cloud may represent a surface of a fingertip (or other object) and may be used to track the location of the fingertip in three-dimensional space, similar tracking may be carried out using one or more image-based approaches including one or more identifying the fingertip in an image, tracking the fingertip over multiple images, and/or other operations. In this manner, a location determined for the fingertip via an image-based approach may be treated in the same or similar manner as a point within a point cloud representing a range of the surface of the fingertip.

In some implementations, one or more physical processors 104 may include and/or may be coupled to non-transitory electronic storage media 114 and/or other components. The non-transitory electronic storage media 114 may be configured to store virtual content information, and/or other information. Virtual content information may define virtual content. Virtual content may have features including one or more of form, size, shape, color, functionality, and/or other defining aspects. In some implementations, virtual content may include virtual objects.

In some implementations, one or more aspects of virtual content may be defined based on values of one or more parameters of the virtual content. The parameters may include one or more of one or more size parameters, one or more color parameters, one or more display parameters, and/or other parameters.

Values of one or more size parameters for a virtual object may specify a perceived size of the virtual object. In some implementations, a size of the virtual object may be specified by a single value for the size parameter and/or a set of values for a set of size parameters. Values of a size parameter may be qualitative and/or quantitative. By way of non-limiting illustration, a value of a size parameter of a virtual object may be specified qualitatively as one or more of "small," "medium," "large," and/or descriptions. Individual qualitative values may be associated with predetermined sizes of the virtual object as it may be perceived by the user in an interactive space. In some implementations, a set of values may be specified for a set of size parameters. The set of size parameters may be associated with dimensions of a virtual object. By way of non-limiting illustration a first size parameter may be associated with size in an x-dimension, a second size parameter may be associated with size in a y-dimension, and a third size parameter may be associated with a z-dimension. Qualitative values of a size parameter may specify numerical values with respect to units of measurement used for specify size (e.g., millimeters, centimeters, and/or other units of measurement).

Values of one or more color parameters for a virtual object may specify color of the virtual object. Color may be defined with respect to a color space and/or other color specification. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of non-limiting illustration, the color space may be an RGB color space, the first color may be red, the second color may be green, and/or the third color may be blue.

Values of one or more display parameters for a virtual object may specify a manner in which a virtual object may be displayed to a user. By way of non-limiting illustration, a manner in which a virtual object may be displayed may refer to one or more of a perspective by which the virtual object may be presented (e.g., plan view, isometric view, etc.), an assembled view of the virtual object, an exploded view of the virtual object, and/or other manners in which a virtual object may be displayed.

In some implementations, an exploded view may be provided in varying degrees. For example, the amount of separation shown between parts in an exploded view may be adjusted. The amount of separation may be reflected by the value of the display parameter directed to the exploded view display of a virtual object. By way of non-limiting illustration, values of a display parameter which causes a virtual object to be displayed in an exploded view state may be in a range of N to M. The value of N may represent no separation of parts in the exploded view, e.g., the virtual object is assembled. The value of M may represent a threshold separation of parts in the exploded view. Values between N and M may represent varying degrees of separation. By way of non-limiting illustration, N may be "0" and M may be "100." In some implementations, the specification of the value of the display parameter causing an exploded view may be facilitated by one or more virtual tools and/or gestures the user may perform using the one or more virtual tools.

In some implementations, virtual content may include one or more of one or more virtual objects, one or more virtual presentation areas, one or more virtual tools, and/or other virtual content.

A virtual presentation area may be provided for generating and/or displaying presentations of virtual content. The presentation may include a set of scenes. Individual scenes may depict virtual content. An individual scene may include one or more virtual objects posed on the virtual presentation area. A pose of a virtual object may include one or more of an aspect ratio, a zoom, a position, a heading (e.g., with respect to pitch, yaw, roll, and/or axis), and/or other arrangement of the virtual object.

In some implementations, a virtual presentation area and/or components of a virtual presentation area may be configured to be manipulated in an interactive space. By way of non-limiting illustration, the virtual presentation area may be rotatable, translatable, expandable, contractible, and/or may be manipulated in an interactive in other ways. In some implementations, manipulation of a virtual presentation area in an interactive space may be based on user input and/or other input (see, e.g., input component 110).

An individual scene or slide of a presentation may be defined by scene information for the individual scene. Scene information defining the individual scene may specify one or more of one or more virtual objects visible on the virtual presentation area for the individual scene, individual poses of individual ones of the one or more virtual objects, and/or other information. Specifying a virtual object may include identifying the virtual object, determining values of one or more parameters of the virtual object, and/or other operations.

A virtual presentation area may include one or more of a central portion, a boundary, and/or other components.

The central portion of a virtual presentation area may include a portion of the virtual presentation area where one or more virtual object may be posed. A central portion may comprise a circular area and/or may comprise an area of other shapes. In some implementations, the central portion may provide one or more visual indication responsive to the posing of virtual objects on the central portion. By way of non-limiting illustration, the central portion may depict a first color when one or more virtual objects are added to the central portion; a second color when one or more virtual objects are removed from the central portion; and a third color when no virtual objects are present on the central portion. In some implementations, the first color may be green; the second color may be yellow; and the third color may be red. In some implementations, the second color (e.g., yellow) may be used when an object is initially being removed and/or attempted to be removed. In some implementations, after a threshold of time has been exceeded, the central portion may turn to the third color (e.g., red). In some implementations, after a second threshold of time has been exceeded with the third color active, removal of the object from the central portion may be completed.

A boundary may an include an area of a virtual presentation area surrounding the central portion of the virtual presentation area. In some implementations, a boundary of a virtual presentation area may be perceived as having an area. For example, the boundary may be perceived as having a visible area extending from a peripheral edge of the central portion. In some implementations, the boundary may be perceived as having little or no area. For example, the boundary may be configured as a line with little or no perceivable surface area.

In some implementations, an individual virtual tool may represent an individual effect that may be applicable to individual virtual objects present in an individual scene of a presentation. In some implementations, one or more virtual tools may be positioned at or near the boundary of a virtual presentation area. In some implementations, one or more virtual tools may be positioned at a virtual presentation area insofar the one or more virtual tools may be perceived to be attached to a boundary of the virtual presentation area. In some implementations, one or more virtual tools may near a virtual presentation area insofar the one or more virtual tools may be perceived to lie in three-dimensional space around the virtual presentation area but not attached to the virtual presentation area.

In some implementations, application of one or more effects on a virtual object via a virtual tool may specify one or more values of one or more parameters of the virtual object. In some implementations, application of one or more effects on a virtual object may alter the visual appearance of the virtual object. By way of non-limiting illustration, effects may include a display effect and/or other effects. An application of a display effect may specify one or more values of one or more display parameters of a virtual object. In some implementations, an application of an effect and/or a specific modification of a virtual object based on an applied effect may be based on user input and/or other information (see, e.g., input component 110).

In some implementations, a display effect may include an exploder effect. Application of an exploder effect may cause a virtual object to change from an assembled view state to an exploded view state. The virtual object may comprise multiple virtual object parts. For example a virtual object may comprise a composite of the multiple virtual object parts. The exploded view state may cause individual virtual object parts in of the multiple virtual object parts to spread apart to present an "explosion" effect. The spreading apart may create perceivable space between individual virtual object parts. In the assembled view state, the individual virtual object parts may be perceived as being attached or connected. Based on how the user applies a virtual tool representing the exploder effect, and the set parameters of that effect, the amount of separation among the various parts of the virtual object may be controllable. The virtual object may have a maximum threshold of separation between individual virtual object parts of the virtual object.

In some implementations, a virtual tool appearing on or near a virtual presentation area may have a different appearance when manipulated by a user. For example, a virtual tool may have a generic shape. Manipulation and/or selection of the virtual tool by a user may cause the virtual tool to appear according to a specified appearance or form. The generic shape may be spherical and/or other shapes. Once selected by a user, the virtual tool may take on an intended appearance or form of the virtual tool. By way of non-limiting illustration, a virtual tool representing an exploder effect may be configured to depict a wand and/or skewer. The wand may comprise a rod-shaped object. The virtual tool may depict a sphere when positioned at or near the virtual presentation area. When selected, the virtual tool may take on the shape of the wand.

In some implementations, application of an exploder effect may be facilitated user input comprising one or more of selecting a virtual tool representing the exploder effect, posing the virtual tool, performing one or more gestures, and/or other input. A pose may refer to a position and/or heading of the virtual tool with respect to a position and/or heading of a virtual object to be exploded. In some implementations, a pose of the virtual tool may be estimated based on a pose of a user's hand, and/or other information. For example, the pose of the hand may dictate the pose of the virtual tool since the virtual tool is perceived as being held by the hand and therefore may be posed naturally with the pose of the hand.

In some implementations, selecting the virtual tool may cause the virtual tool to take on the form of a wand. The selection may require the user to perform one or more gestures in order for the selection of the virtual tool to be effectuated. For example, a gesture for selection may include pinching the virtual tool and otherwise grabbing the virtual tool.

The system may be configured to require the user to pose the wand or skewer to appear as if it is pierced into the virtual object. The piercing may be performed such that the wand may be aligned with a centerline of the virtual object or a part thereof. The centerline of the virtual object may be visual or not. In some implementations, posing the wand or skewer along the centerline of a part of the virtual object will cause the system to display an effect in or around the part of the virtual object. In some implementations, such an effect will be a visual "glow" or sound effect that can vary in intensity with the proximity of the virtual tool to the object; for example, the part of the virtual object may glow with increasing intensity as the user moves the virtual tool closer to the part of the object, along the centerline of the part of the object. In some implementations, a centerline may not be present in a given virtual object. A virtual centerline may be created along an axis of the wand upon the user piercing the object with the virtual tool. In some implementations, the wand may "snap" to a centerline of a virtual object within a threshold distance from the virtual object. This pose may cause the exploder effect to be "active." When active, one or more subsequent gestures by the user may cause a value of a display parameter for the virtual object to change. The change in the value may be reflected in a change in appearance of the virtual object to an exploded view state. The one or more subsequent gestures may be incrementally performed. The amount of separation between parts of the virtual object in the exploded view state may be incrementally adjusted. In some implementations, the one or more gestures may include drawing or pulling out the wand or skewer and/or an end of the wand or skewer that the user may be pinching and/or otherwise grabbing in a direction away from the virtual object. As the wand or skewer is drawn out, the virtual object may start to "explode" by increasing separation between parts of the virtual object that were otherwise perceived as being connected. An indication may be provided by the user when a maximum threshold of separation may be achieved. The indication may be one or more of visual, audible, and/or tactical.

In some implementations, the wand may "snap" to a centerline of a virtual object within a threshold distance from the virtual object. This pose may cause the exploder effect to be "active." When active, one or more subsequent gestures by the user may cause a value of a display parameter for the virtual object to change. The change in the value may be reflected in a change in appearance of the virtual object to an exploded view state. The one or more subsequent gestures may be incrementally performed. The amount of separation between parts of the virtual object in the exploded view state may be incrementally adjusted. In some implementations, the one or more gestures may include drawing out the wand and/or an end of the wand that the user may be pinching and/or otherwise grabbing. The drawing out may include pulling the wand in a direction away from the virtual object. As the wand is drawn out, the virtual object may start to "explode" by increasing separation between parts of the virtual object that were otherwise perceived as being connected. An indication may be provided by the user when a maximum threshold of separation may be achieved. The indication may be one or more of visual, audible, and/or tactical.

In some implementations, an amount or distances over which a gesture may be performed by a user may be proportional to an amount separation that may be achieved in an exploded view state. For example, a distance that a user draws the virtual tool out of a virtual object may be proportional to an amount of separation achieved between virtual object parts of a virtual object. In some implementations, the proportion may be one-to-one. That is, drawing the virtual tool out five centimeters may cause five centimeters of separation to be formed between virtual object parts. In some implementations, the proportion may be linear and/or based on other function. For example, the proportion may be one-to-two. That is, drawing the virtual tool out five centimeters may cause ten centimeters of separation to be formed between virtual object parts. In some implementations, a proportion of separation may be a function related to how many object parts are included in a given virtual object.

In some implementations, a gesture of releasing the virtual tool may cause the virtual object to maintain a current exploded view state. The user may then perform other gestures for manipulating the virtual object as desired. This may include moving, rotating, zooming, and/or other manipulations.

In some implementations, to collapse the virtual object back to an assembled view state, the user may perform a gesture of pushing the wand and/or the end of the wand. The pushing may be performed in a direction toward the virtual object. In some implementations, the pushing may cause the virtual object to collapse back to the assembled view state. An indication may be provided by the user once the assemble view state is achieved. The indication may be one or more of visual, audible, and/or tactical.

In some implementations, the virtual tool forming the wand may have an effect reference portion and/or other components. The effect reference portion may be disposed at or near an end of the wand that may be perceived as being held by the user. The effect reference portion may be modified response to one or more gestures for drawing out and/or pushing in the wand. For example, the modification to the effect reference portion may reflect how the value for the display parameter for the virtual object is changing. The effect reference portion may provide a visual reference for the amount of separation between parts of a virtual object during the gesture of drawing out the wand. In some implementations, the effect reference portion may include a segment of the wand that may appear to expand concurrently with the separation of parts of the virtual object. The effect reference portion may provide an indicator to the user as to what degree the virtual object may be exploded. This may benefit the user in the event that the virtual object includes relatively small or intricate parts where the separation between parts may not be apparently visible.

Figure 5:
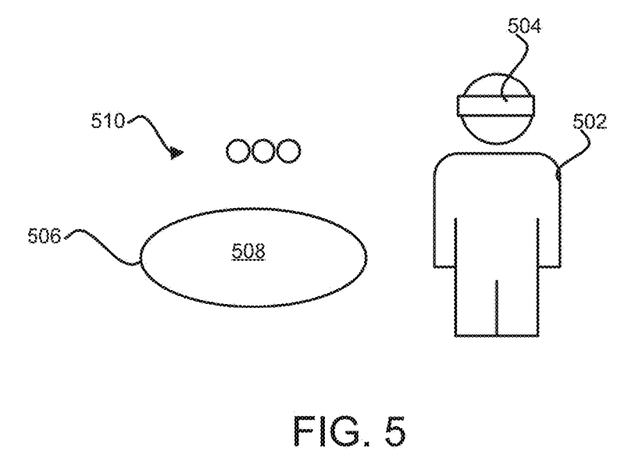
FIG. 5 shows a view of a user of an interactive space and virtual content perceived to be present in the real world.

FIG. 5 illustrates a user 502 of an interactive space and virtual content perceived to be present in the real world. The user 502 may be wearing an HMD 504 and/or other components. The HMD 504 may include one or more components of system 100 (FIG. 1) to facilitate presenting virtual content in the interactive space. The virtual content may include one or more of a virtual presentation area 506, a set of virtual tools 510, and/or other virtual content. The virtual presentation area 506 may include a central portion 508 and/or other components. Virtual content may be selected, posed, and viewed on central portion 508 (not shown in FIG. 5).

Returning to FIG. 1, one or more physical processors 104 may be configured by machine-readable instructions 106. Executing machine-readable instructions 106 may cause one or more physical processors 104 to facilitate providing an exploder effect in an interactive space. The machine-readable instructions 106 may include one or more of a control component 108, an input component 110, an application component 112, a presentation component 113, and/or other components.

In some implementations, control component 108 may be configured to control one or more components of system 100. In some implementations, control component 108 may be configured to control individual light sources of one or more light sources 122, and/or other components. In some implementations, control of individual light sources of one or more light sources 122 may include control of the generation and/or emission of light to generate images forming virtual content, and/or other types of control.

By way of non-limiting illustration, control component 108 may be configured to control one or more light sources 122 to generate an image forming an instance of a virtual presentation area and/or other virtual content. The control component 108 may be configured to control one or more light sources 122 to generate one or more images forming one or more instances of one or more virtual objects, and/or other virtual content. The control component 108 may be configured to control one or more light sources 122 to generate one or more images forming one or more instances of one or more virtual tools, and/or other virtual content. A first virtual object may comprise a composite virtual object. The first virtual object may be formed of multiple virtual object parts. A first virtual tool may represent an exploder effect. The first virtual tool may be perceived at position at or near a boundary of the instance of the virtual presentation area, and/or other locations. The first virtual tool may have a generic form when positioned at or near a boundary of the instance of the virtual presentation area. The first virtual tool may have an other form when manipulated and/or selected by a user. The other form may be specific to the exploder effect. The other form may comprise the rod-shape forming a wand.

In some implementations, input component 110 may be configured to obtain user input for manipulating virtual content in an interactive space. Obtaining user input may include obtaining information representing a user's actions and/or interactions with system 100. This may include one or more of receiving such information, accessing such information, determining such information, and/or obtaining such information in other ways. The user input may comprise gesture based input and/or other input. In some implementations, user input may be derived from one or more of sensor output of one or more sensors 120, sensor output from one or more other sensors, and/or other sources.

The input component 110 may be configured to detect and/or recognize one or more real-world objects based on sensor output from one or more sensors 120. A real-world object may include, for example, a human hand and/or other user appendage. One or more real-world objects may be recognized based on one or more point clouds having points lying on one or more surface of the one or more real-world objects. By way of non-limiting illustration, a point cloud having a shape of a known real-world object (e.g., a human hand) may be recognized as the real-world object. Recognition of a real-world object may include identification of the presence of the real-world object using the output signals (e.g., point cloud).

In some implementations, input component 110 may be configured to identify gestures being performed by one or more real-world objects. A gesture may include one or more of reaching, grabbing, pinching, releasing, swiping, pulling/drawing, throwing, clicking, pointing, pushing, and/or other gestures and/or actions of real-world objects. By way of non-limiting illustration, input component 110 may utilize one or more gesture recognition techniques to identify one or more gestures being performed by one or more real-world objects. The input component 110 may be configured to provide one or more identified gestures and/or actions as user input for manipulating virtual content in an interactive space.

The input component 110 may be configured to obtain user input comprising gesture-based inputs for manipulating one or more virtual objects, including virtual tools. Manipulating a virtual tool may include a series of gesture-based inputs. The gesture-based inputs may include one or more of a gesture of grabbing the virtual tool, a gesture of holding or pinching the virtual tool, posing the virtual tool, and/or other input. In some implementations, a gesture of grabbing the virtual tool may constitute a selection of the virtual tool to apply an effect to a virtual object.

In some implementations, specifying an exploder effect to apply to virtual objects may include a set of gesture-based inputs. The set of gesture-based inputs may include manipulations of a virtual tool that provides the exploder effect. By way of non-limiting illustration, the set of gestures may include one or more of a grabbing and/or pinching the virtual tool, posing the virtual tool in relation to the virtual object (e.g., insert the virtual tool into the virtual object), drawing out an end of the virtual tool, pushing in the end of the virtual tool, and/or other manipulation.

In some implementations, input component 110 may be configured to track a user appendance as the user performs gestures or otherwise interacts with content in an interactive space. By way of non-limiting illustration, a hand may be tracked by determining positions of one or more features of the hand using position information and/or other information. Positions of one or more features of a hand may be determined through one or more iterations including operations of determining estimated positions of individual features from estimated positions of other ones of the features. Such an iterative procedure may be performed as position information may be obtained. The position information may be obtained based on a sampling rate of a given sensor.

In some implementations, an estimated position of a first feature of a hand may be determined from position information. In an iteration, an estimated position of a second feature may be determined from the estimated position of the first feature. An estimated position of a set of features may be determined from the estimated position of the second feature. Another estimated position of the first feature may be determined from the estimated position of the set of features. An estimated position of the set of features may include a set of positions wherein individual positions in the set of positions correspond to individual features in the set of features. The estimated positions of the first feature may be compared to determine a difference between those positions.

Based on the difference being equal to or below a threshold distance, the positions of one or more of the first feature, second feature, set of features, and/or other features may be specified by the corresponding estimated featured positions used in the current iteration. The threshold distance may comprise one centimeter, and/or other distances.

Based on the difference being equal to or above a threshold distance, one or more further iterations may be performed. At an iteration where a difference in estimated positions of the first feature may be below a threshold distance, the positions of one or more features may be specified by the estimated positions of the one or more features used in that iteration.

By way of non-limiting illustration, given a position of a first feature of a hand, a position of a second feature may be determined based on one or more of a range of distances from the position of the first feature that may be anatomically possible to correspond to the position of the second feature, one or more directions from the position of the first feature that may be anatomically possible to point to the position of the second feature, and/or other information. By way of non-limiting illustration, given a position of a wrist of a hand, a position of a thumb may be determined based on one or more of a range of distances from the wrist position that may be anatomically possible to correspond to the position of the thumb, one or more directions from the position of the wrist that may be anatomically possible to point to the position of the thumb, and/or other information.

The application component 112 may be configured to, responsive to obtaining user input specifying an effect (e.g., an exploder effect) to apply to virtual objects, specify one or more values of one or more parameters of the virtual objects to reflect the application of the effect.

By way of non-limiting illustration, drawing out the virtual tool to explode a virtual object may cause application component 112 to specify one or more values of one or more display parameters. By way of non-limiting illustration, pushing in the virtual tool to collapse a virtual object may cause application component 112 to change one or more values of one or more display parameters. The specification of values may be based on the corresponding gestured being performed. For example, when drawing out the virtual tool, values may be specified that are related to obtaining an exploded view state. When pushing in the virtual tool, values may be specified that are related to obtaining an assembled view state.

The presentation component 113 may be configured to effectuate presentation of the result of application of effects to virtual content. In some implementations, the presentation may be effectuated by sending instructions to control component 108 to control one or more image-forming components to modify images of virtual content to reflect specification and/or changes in values of display parameters of virtual content. For example, based on a value of a display parameter for a virtual object being specified in response to user input to apply an exploder effect to the virtual object, presentation component 113 may instruct control component 108 to control one or more image-forming components to modify images forming the virtual object to reflect the specification (or change) in value of the display parameter.

Figure 6:
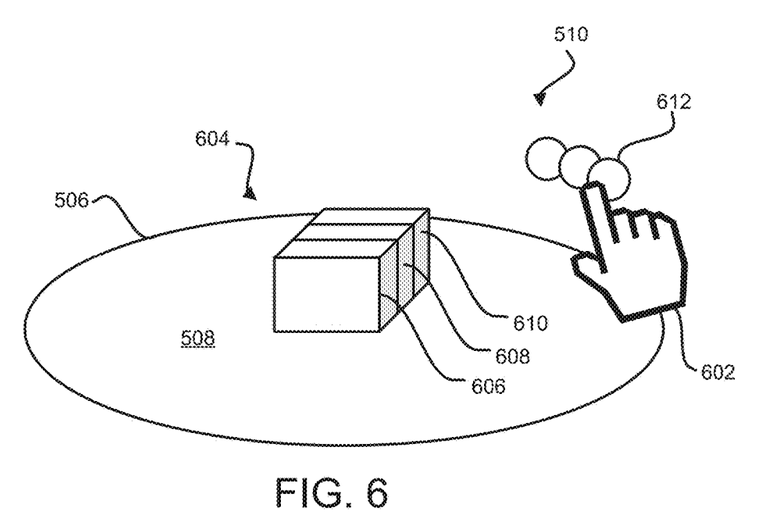
FIG. 6 shows a view of virtual content perceived to be present in an interactive space from the perspective of a user of the interactive space.

FIG. 6 shows a view of virtual content perceived to be present in an interactive space from the perspective of user 502 of FIG. 5. A user object 602 is shown. The user object 602 may include a hand. The virtual content may include one or more of virtual presentation area 506, set of virtual tools 510, virtual object 604, and/or other virtual content. The virtual object 604 may be formed from one or more of a first virtual object part 606, a second virtual object part 608, a third virtual object part 610, and/or other virtual object parts.

FIG. 6 further illustrates a selection via user object 602 of a first virtual tool 612 included in set of virtual tools 510. The first virtual tool 612 may represent an exploder effect. The first virtual tool 612, when presented in set of virtual tools 510, may have a generic shape. The generic shape may be spherical and/or other shapes and/or forms.

Figure 7:
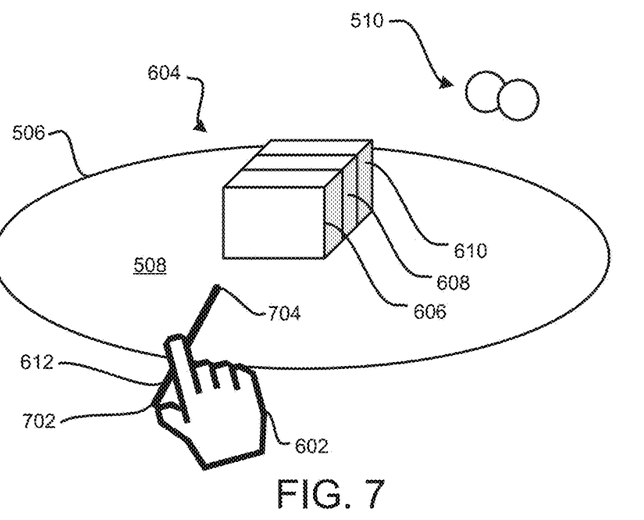
FIG. 7 shows a view of virtual content perceived to be present in an interactive space from the perspective of a user of the interactive space.

FIG. 7 shows another view of the interactive space responsive to the selection of first virtual tool 612. The selection may cause first virtual tool 612 to change to a tool-specific shape. The tool-specific shape may be rod-shaped forming a wand, and/or other shapes. The first virtual tool 612 may have one or more of a first end 702, a second end 704, an effect reference portion (not shown in FIG. 7), and/or other components. The first virtual tool 612 may be perceived as being held by the user object 602 at first end 702 and/or a portion of first virtual tool 612 at or near first end 702.

Figure 8:
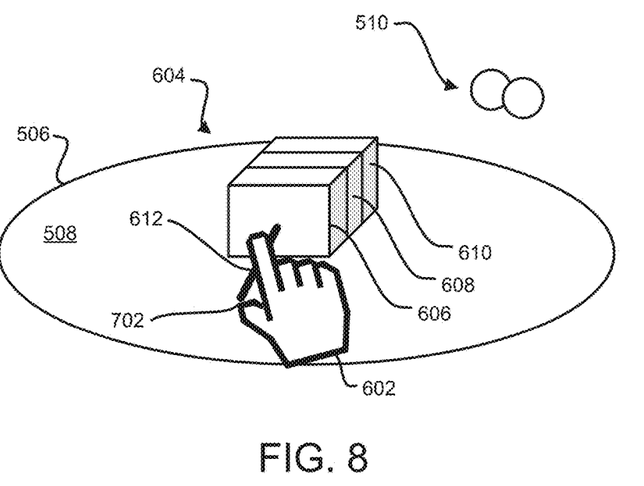
FIG. 8 shows a view of virtual content perceived to be present in an interactive space from the perspective of a user of the interactive space.

FIG. 8 shows a view of first virtual tool 612 being posed to activate the exploder effect. For example, second end 704 (not shown in FIG. 8) may be inserted, or pierced, into virtual object 604.

Figure 9:
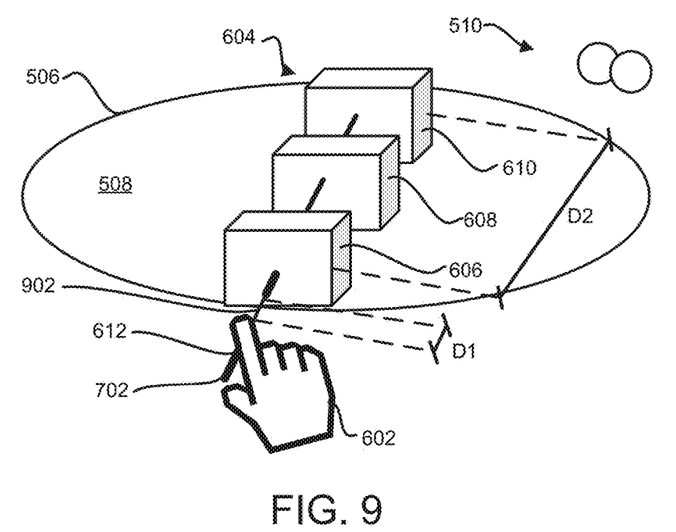
FIG. 9 shows a view of virtual content perceived to be present in an interactive space from the perspective of a user of the interactive space.

FIG. 9 shows a view of user object 602 performing a first gesture in application of the exploder effect. The first gesture may include drawing first virtual tool 612 away from virtual object 604. The first gesture may effectuate the exploder effect. The virtual object 604 may achieve an exploded view state in response to the first gesture. The amount of spacing may depend on the extent of the first gesture (e.g., how far first virtual tool 612 is drawn away from virtual object 604). As shown, separation may be created between first virtual object part 606 and second virtual object part 608, and second virtual object part 608 and third virtual object part 610.

The effect reference portion 902 of first virtual tool 612 is shown. The effect reference portion 902 may be modified in response to the first gesture. For example, effect reference portion 902 may comprise a portion of first virtual tool 612 that may expand or elongate in response to the first gesture. The effect reference portion 902 may provide a visual reference as to the degree or amount of separation (e.g., explosion) that has been applied to first virtual object 604. For example, virtual object 604 may explode to a length of D2. The effect reference portion 902 may expand to a length of D1. The ratio of the length D1 to a total length of first virtual tool 612 may be proportional to the length D2 to an unexploded length of virtual object 604. Thus the effect reference portion 902 may provide a visual reference as to the state of expansion of virtual object 604. If the user releases first virtual tool 612, virtual object 604 may maintain the exploded view state achieved by the first gesture.

Figure 10:
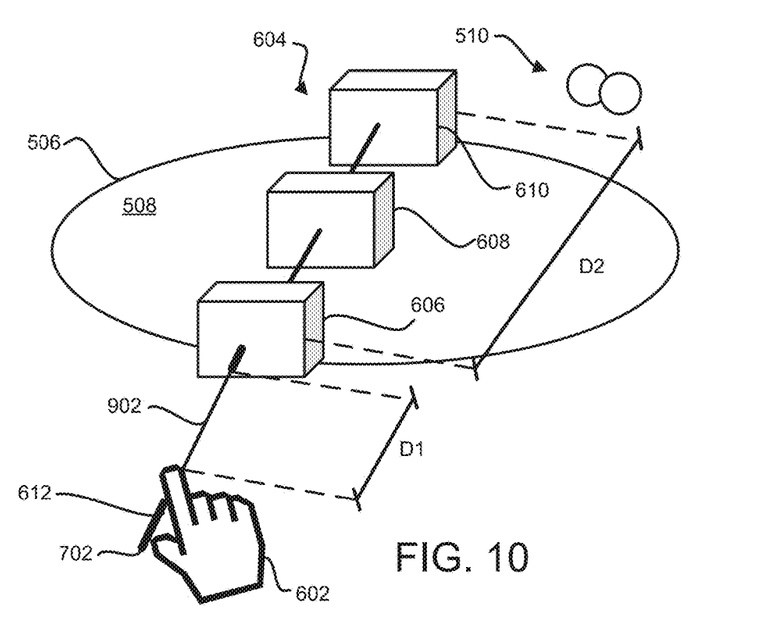
FIG. 10 shows a view of virtual content perceived to be present in an interactive space from the perspective of a user of the interactive space.

FIG. 10 shows a view of user object 602 performing a second gesture in application of the exploder effect. The second gesture may be a continuance of the first gesture. For example, the second gesture may represent a further drawing of first virtual tool 612 away from virtual object 604. The lengths D1 and D2 have increased to reflect the further drawing of first virtual tool 612 away from virtual object 604. If the user releases first virtual tool 612, virtual object 604 may maintain the exploded view state achieved by the second gesture. The processes described in connection with FIGS. 8-10 may be reversed to return to an assembled view state of virtual object 604, or may be reversed in part to partially return the virtual object to the assembled view state of virtual object 604.

In FIG. 1, processor(s) 104, one or more sensors 120, one or more light sources 122, one or more optical elements 124, external resources 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which processor(s) 104, one or more sensors 120, one or more light sources 122, one or more optical elements 124, external resources 126, and/or other components of system 100 may be operatively linked via some other communication media.

The external resources 126 may include sources of information, hosts, external entities participating with system 100, providers of virtual content, and/or other resources. In some implementations, some or all of the functionality attributed herein to external resources 126 may be provided by resources included in system 100.

The processor(s) 104 may include and/or have access to electronic storage 114, and/or other components. The processor(s) 104 may include communication lines or ports to enable the exchange of information with a network, electronic storage 114, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, and/or 113. Processor(s) 104 may be configured to execute components 108, 110, 112, and/or 113 by software; hardware; firmware; some combination of software, hardware, and/or firmware; and/or other mechanisms for configuring processing capabilities on processor(s) 104.

It should be appreciated that although components 108, 110, 112, and/or 113 are illustrated in FIG. 1 as being co-located within a single processing unit, in implementations in which processor(s) 104 includes multiple processing units, one or more of components 108, 110, 112, and/or 113 may be located remotely from the other components. The description of the functionality provided by the different components 108, 110, 112, and/or 113 described above is for illustrative purposes and is not intended to be limiting, as any of components 108, 110, 112, and/or 113 may provide more or less functionality than is described. For example, one or more of components 108, 110, 112, and/or 113 may be eliminated, and some or all of its functionality may be provided by other ones of components 108, 110, 112, 113, and/or other components. As another example, processor(s) 104 may be configured to execute one or more additional components that may perform some or all of the functionality attributed to one of components 108, 110, 112, and/or 113.

Figure 2:
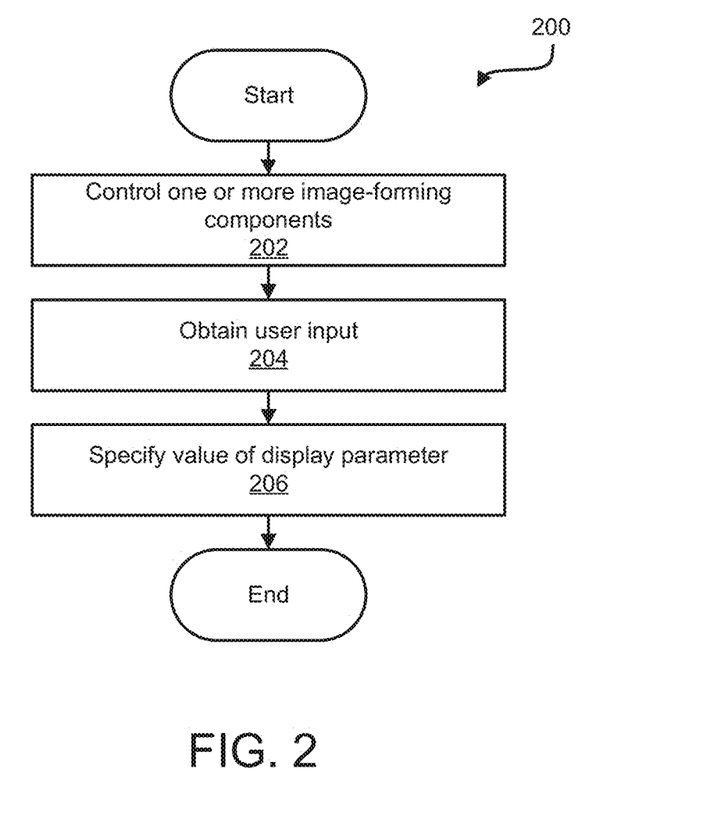
FIG. 2 illustrates a method to provide effects for virtual content in an interactive space, in accordance with one or more implementations.

FIG. 2 illustrates a method 200 to provide effects for virtual content in an interactive space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more image-forming components (e.g., one or more light sources, one or more sensors, one or more optical elements, and/or other components), and/or other components. The one or more processing devices may include one or more devices executing some or all of the operations of method 200 in response to instructions stored electronically on electronic storage medium. The one or more processing devices may include one or more devices configured through hardware, firmware, and/or software to be specifically designed for execution of one or more of the operations of method 200.

At an operation 202, one or more image-forming components may be controlled to generate images forming virtual content. The one or more image-forming components are controlled to generate an image forming an instance of a virtual object. The one or more image-forming components are controlled to generate an image forming an instance of a virtual tool. The virtual tool may represent an exploder effect. In some implementations, operation 202 may be performed by one or more physical processors executing a control component the same as or similar to control component 108 (shown in FIG. 1 and described herein).

At an operation 204, user input to apply the exploder effect to the virtual object may be obtained. The user input may comprise one or more of a selection of the virtual tool, a pose of the virtual tool in relation to the virtual object, a gesture configured to effectuate the application of the exploder effect, and/or other input. The pose may include a position and/or heading of the virtual tool with respect to a position and/or heading of the virtual object. In some implementations, operation 204 may be performed by one or more physical processors executing an input component the same as or similar to input component 110 (shown in FIG. 1 and described herein).

At an operation 206, in response to obtaining the user input comprising the gesture and/or other input, a value of a display parameter for the virtual object may be specified. The value of the display parameter may effectuate the application of the exploder effect to the virtual object. The specification of the value of the display parameter may cause the virtual object to be perceived in an exploded view state. In some implementations, operation 206 may be performed by one or more physical processors executing an application component the same as or similar to application component 112 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide effects for virtual content in an interactive space, the system comprising:
   a device configured to be installed on a head of a user;
   one or more image-forming components held by the device, the one or more image-forming components being configured to generate light rays to form images of virtual content, the one or more image-forming components being configured such that when the device is installed on a head of a user, the images are presented to the user and superimposed over views of the real world to create an interactive space;
   one or more physical processors configured by machine-readable instructions to:
      control the one or more image-forming components to generate the images forming the virtual content, such that the one or more image-forming components are controlled to:
      generate an image forming an instance of a virtual object; and
      generate an image forming an instance of a virtual tool, the virtual tool representing an exploder effect;
      obtain user input to apply an exploder effect to the virtual object, the user input comprising:
         selection of the virtual tool;
         a pose of the virtual tool in relation to the virtual object, the pose including a position and/or heading of the virtual tool with respect to a position and/or heading of the virtual object; and
         a gesture configured to effectuate the application of the exploder effect; and
      in response to obtaining the user input comprising the gesture, specify a value of a display parameter for the virtual object, the value of the display parameter effectuating the application of the exploder effect to the virtual object, wherein the specification of the value of the display parameter causes the virtual object to be perceived in an exploded view state.

2. The system of claim 1, wherein:
   the user input further comprise a second gesture; and
   the one or more physical processors are further configured by the machine-readable instructions to, in response to obtaining the user input comprising the second gesture, modify the value of the display parameter for the virtual object, the modification of the value of the display parameter causing the virtual object to be perceived in a further modified exploded view state.

3. The system of claim 1, wherein the device is a headset.

4. The system of claim 1, wherein the virtual tool includes an effect reference portion, wherein the effect reference portion is modified in response to the gesture, such that the modification to the effect reference portion reflects the specification of the value of the display parameter for the virtual object.

5. The system of claim 1, wherein the virtual tool is rod or wand shaped.

6. The system of claim 5, wherein the pose corresponds to a perception of the virtual tool being inserted into the virtual object by the user.

7. The system of claim 6, wherein the gesture includes drawing the virtual tool away from the virtual object.

8. The system of claim 1, wherein the one or more physical processors are further configured by the machine-readable instructions to:
   obtain output signals from one or more sensors, the output signals conveying position information, the position information including position or range of surfaces of objects present in the real world;
   identify, based on the output signals, presence of a user object; and
   identify the gesture by tracking the identified user object.

9. The system of claim 8, wherein the one or more sensors comprise a depth sensor held by the device.

10. The system of claim 1, wherein the interactive space is an augmented reality environment.

11. A method to provide effects for virtual content in an interactive space, the method comprising:
    controlling one or more image-forming components to generate images forming virtual content, the one or more image-forming components being held by a device, the one or more image-forming components being configured such that when the device is installed on a head of a user, the images are presented to the user and superimposed over views of the real world to create an interactive space, including controlling the one or more image-forming components to:
       generate an image forming an instance of a virtual object; and
       generate an image forming an instance of a virtual tool, the virtual tool representing an exploder effect;
    obtaining user input to apply an exploder effect to the virtual object, the user input comprising:
       selection of the virtual tool;
       a pose of the virtual tool in relation to the virtual object, the pose including a position and/or heading of the virtual tool with respect to a position and/or heading of the virtual object; and
       a gesture configured to effectuate the application of the exploder effect; and
    in response to obtaining the user input comprising the gesture, specifying a value of a display parameter for the virtual object, the value of the display parameter effectuating the application of the exploder effect to the virtual object, wherein specifying the value of the display parameter causes the virtual object to be perceived in an exploded view state.

12. The method of claim 11, wherein the user input further comprises a second gesture, and wherein the method further comprises:
    in response to obtaining the user input comprising the second gesture, modifying the value of the display parameter for the virtual object, the modifying the value of the display parameter causing the virtual object to be perceived in a further modified exploded view state.

13. The method of claim 11, wherein the device is a headset.

14. The method of claim 11, wherein the virtual tool includes an effect reference portion, and wherein the method further comprises:
    modifying the effect reference portion in response to the gesture, such that the modification to the effect reference portion reflects the specification of the value of the display parameter for the virtual object.

15. The method of claim 11, wherein the virtual tool is rod or wand shaped.

16. The method of claim 15, wherein the pose corresponds to a perception of the virtual tool being inserted into the virtual object by the user.

17. The method of claim 16, wherein the gesture includes drawing the virtual tool away from the virtual object.

18. The method of claim 11, further comprising:
obtaining output signals from one or more sensors, the output signals conveying position information, the position information including position or range of surfaces of objects present in the real world;
identifying, based on the output signals, presence of a user object; and
identifying the gesture by tracking the identified user object.

19. The method of claim 18, wherein the one or more sensors comprise a depth sensor held by the device.

20. The method of claim 11, wherein the interactive space is an augmented reality environment.

\* \* \* \* \*